US010970759B2

(12) United States Patent
Reing-Hurley et al.

(10) Patent No.: US 10,970,759 B2
(45) Date of Patent: Apr. 6, 2021

(54) SYSTEMS AND METHODS FOR SINGLE SWIPE CROSS-CHANNEL SALES

(71) Applicant: Victoria's Secret Stores Brand Management, Inc., Reynoldsburg, OH (US)

(72) Inventors: Scott Reing-Hurley, Columbus, OH (US); Brett Jason Hanley, Hilliard, OH (US); JoEllen Elizabeth Kunce, Columbus, OH (US); Kyle Clark, Ashville, OH (US); Rodney Darius Fleming, Gahanna, OH (US); Christian T. Coughlan, Columbus, OH (US); Ravishankar Narasimhan, New Albany, OH (US); Amila Rajasekera, Andover, MA (US)

(73) Assignee: MAST INDUSTRIES (FAR EAST) LIMITED, Kowloon (HK)

( * ) Notice: Subject to any disclaimer, the term of this patent is extended or adjusted under 35 U.S.C. 154(b) by 0 days.

(21) Appl. No.: 13/840,304

(22) Filed: Mar. 15, 2013

(65) Prior Publication Data
US 2014/0279114 A1 Sep. 18, 2014

(51) Int. Cl.
*G06Q 30/06* (2012.01)
(52) U.S. Cl.
CPC ............... *G06Q 30/0601* (2013.01)

(58) Field of Classification Search
None
See application file for complete search history.

(56) References Cited

U.S. PATENT DOCUMENTS

| | | | |
|---|---|---|---|
| 8,744,919 B1 * | 6/2014 | O'Dea | G06Q 30/0635 705/26.1 |
| 2005/0240525 A1 * | 10/2005 | Bagayatkar | G06Q 20/102 705/40 |
| 2009/0076941 A1 * | 3/2009 | Schneierson | G06Q 40/04 705/37 |
| 2009/0222418 A1 * | 9/2009 | Layman | G06Q 30/0603 |
| 2012/0030044 A1 * | 2/2012 | Hurst | G06Q 20/206 705/18 |

\* cited by examiner

*Primary Examiner* — Paul Danneman
(74) *Attorney, Agent, or Firm* — Ballard Spahr LLP (57) ABSTRACT

This disclosure relates to methods and systems for selling products across sales channels in a single swipe transaction. In one aspect a method for purchasing products is disclosed. The method includes identifying a first product to be purchased from a first sales channel, determining whether the first product is available from the first sales channel, in response to determining that the first product is not available from the first sales channel, determining whether the first product is available from a second sales channel, in response to determining that the first product is available from the second sales channel, adding the first product from the second sales channel to the transaction, and selling the first product from the second sales channel, wherein the transaction is completed with a single tender.

17 Claims, 8 Drawing Sheets

Fig. 8

SYSTEMS AND METHODS FOR SINGLE SWIPE CROSS-CHANNEL SALES

CROSS REFERENCE TO RELATED APPLICATIONS

This application relates to U.S. application Ser. No. 13/839,904, titled Systems and Methods for Cross-Channel Sales, filed on Mar. 15, 2013.

BACKGROUND

Conventional systems for distributing products are typically based on the model that a product can only be purchased from a single sales channel in any single transaction. For example, retail stores will often have both a brick-and-mortar presence and an internet presence. The products that are sold through these two sales channels may come from a single source (or be identical products). Nevertheless, conventional sales distribution systems treat these two sales channels as two separate businesses, each with its own accounting, distribution, and reconciliation.

This conventional arrangement leads to the result that a customer may often have to go through multiple sales channels to purchase all of the items they would like to buy. For example, the user may travel to a store in hopes of buying several items, only to find out that one of the items they wanted to buy is sold out in the store, but is available over the internet. To obtain all of the products they desired, the customer may have to both complete their purchase from the store and then make a second transaction over the store's internet storefront. This causes inconvenience, which may lead to reduced sales.

SUMMARY

It is to be understood that both the following general description and the following detailed description are exemplary and explanatory only and are not restrictive, as claimed. Provided are methods and systems for providing single swipe transactions for cross-channel sales. In one aspect, a method for purchasing products is disclosed. The method includes identifying a first product to be purchased from a first sales channel, determining whether the first product is available from the first sales channel, and in response to determining that the first product is not available from the first sales channel, determining whether the first product is available from a second sales channel. In response to determining that the first product is available from the second sales channel, adding the first product from the second sales channel to the transaction and selling the first product from the second sales channel, wherein the transaction is completed with a single tender. The tender can be at least one of: a credit card transaction, a debit card transaction, a cash transaction, and a near field communications transaction.

The method can include selling a second product from the first sales channel with the product from the second sales channel using the same tender. In that case, the first sales channel can be a sales channel for retail stores. The second sales channel can be an internet sales channel.

The method can also include reconciling the purchase of the first product and the second product among the first sales channel and the second sales channel. The reconciling step may further include the steps of identifying purchases attributable to the first sales channel, identifying purchases attributable to the second sales channel, allocating the purchases attributable to the first sales channel to the first sales channel; and allocating the purchases attributable to the second sales channel to the second sales channel.

The system can also reconcile the price of the first product. Reconciling the price can include the steps of determining a first channel price, determining a second channel price, applying a price selection policy and charging the selected price. The price selection policy comprises at least one of charging the lowest price for an item, charging the price associated with the first sales channel for the item, and allowing the customer to choose a price.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
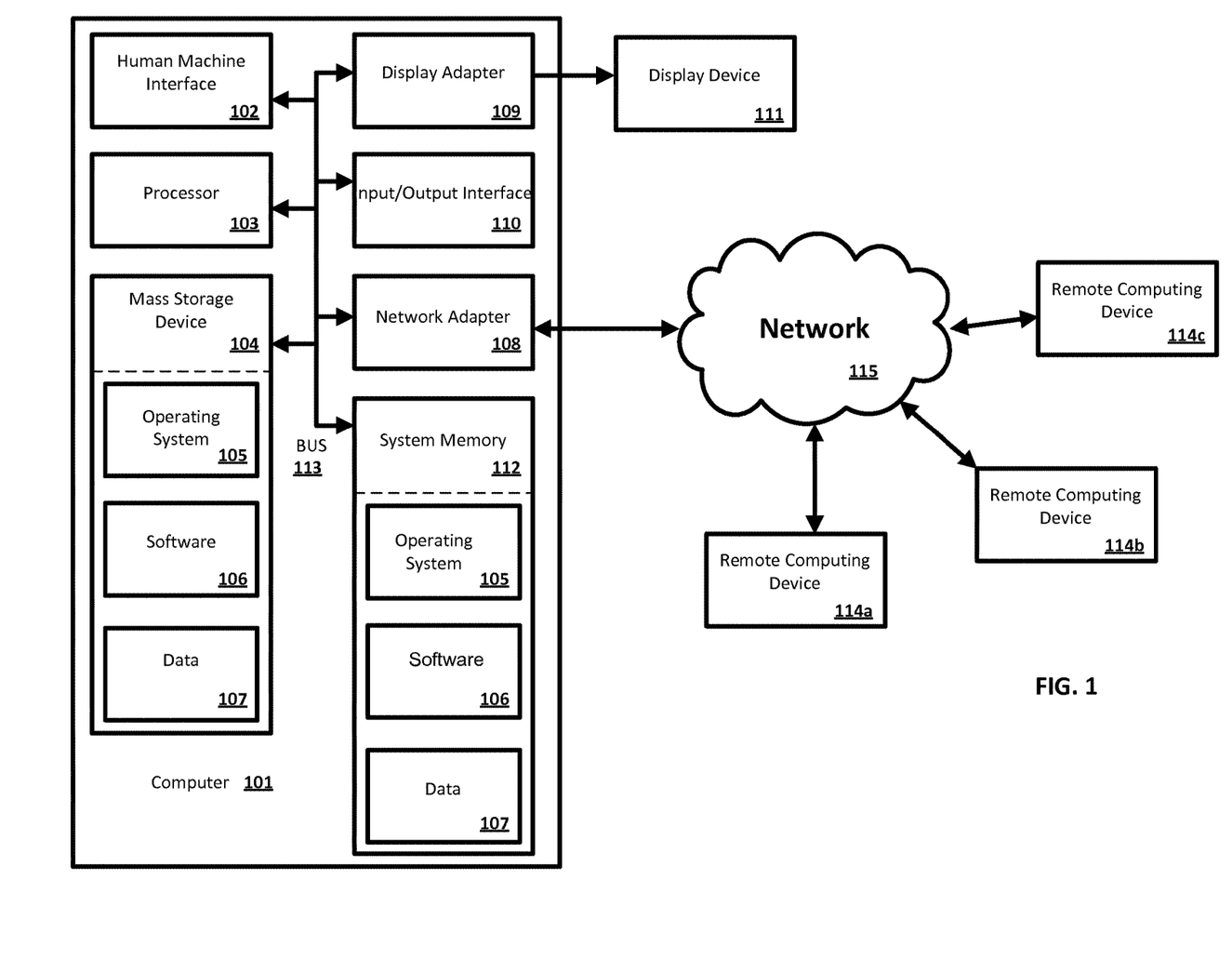
FIG. 1 is a block diagram illustrating an exemplary system in which the methods and systems described herein can operate.

FIG. 1 illustrates various aspects of an exemplary system in which the present methods and systems can operate. The present disclosure relates to methods and systems for cross channel sales. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary aspect, the methods and systems can be implemented on a computer 101 as illustrated in FIG. 1 and described below. The methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise point of sale devices, set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, software 106, data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 may contain data such as media, video, audio, program code, markup language, or other data 107 and/or program modules such as operating system 105 and software 106 capable of manipulating information pertaining to cross-channel sales, including, without limitation, the data 107 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and content delivery software 106. Each of the operating system 105 and content delivery software 106 (or some combination thereof) can comprise elements of the programming and the content delivery software 106. Media, video, audio, program code, markup language, or other data 107 can also be stored on the mass storage device 104. Media, video, audio, or other data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114a,b,c. By way of example, a remote computing device can be a personal computer, portable computer, smartphone, a server, a router, a network computer, a point of sale device, a peer device or other common network node, and so on. Logical connections between the computer 101 and a remote computing device 114a,b,c can be made via a network 115, such as a local area network (LAN) and/or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of content delivery software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
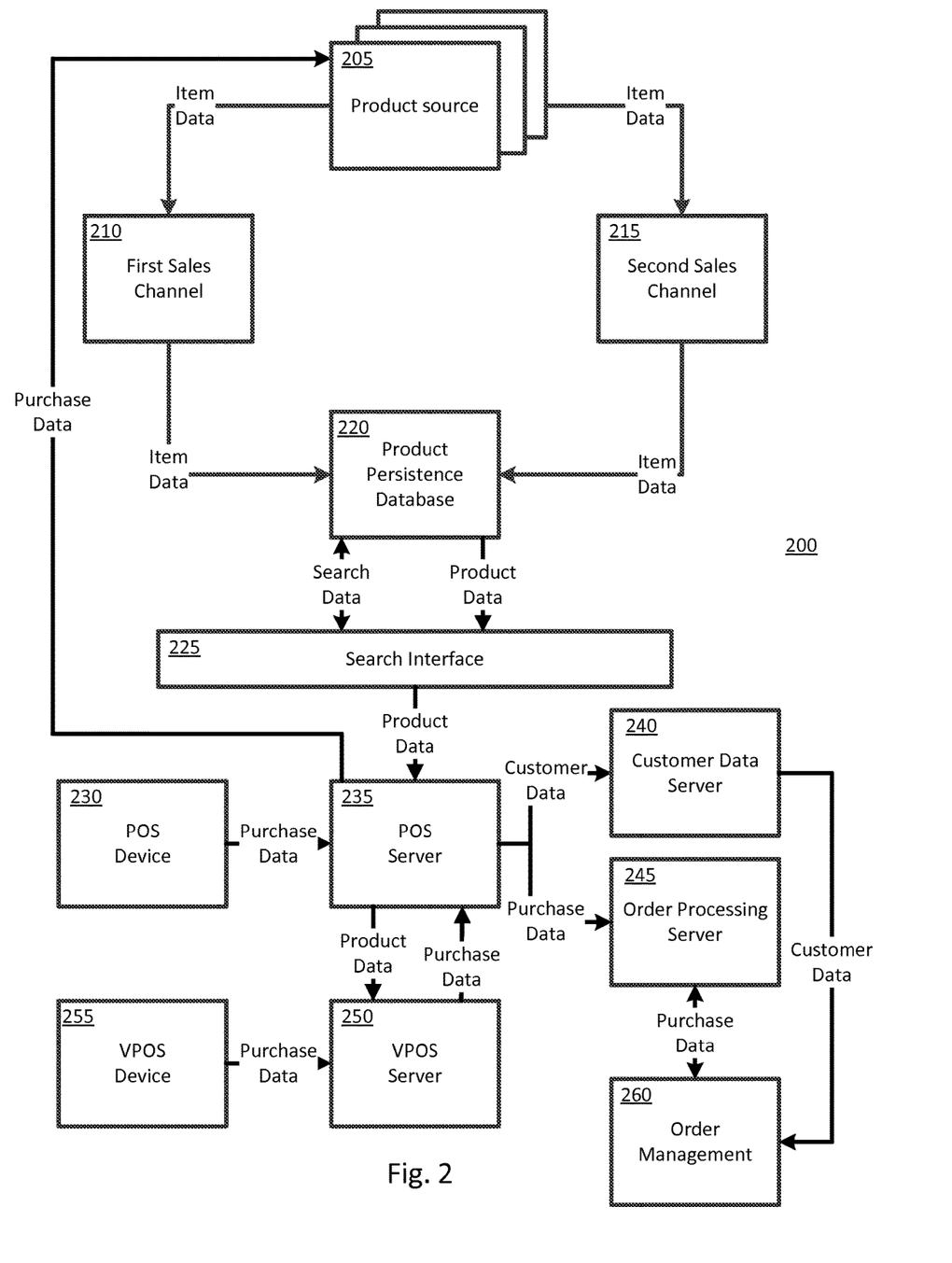
FIG. 2 is a block diagram illustrating an exemplary embodiment of a system for cross-channel sales in accordance with the methods and systems described herein.

Turning now to FIG. 2, a block diagram illustrating an exemplary embodiment of a system for cross-channel sales in accordance with the methods and systems described herein is shown. The system includes at least one product source 205. In an exemplary embodiment, the product source 205 is a database of product information about products that can be sold through the system for cross-channel sales. The products may all be made by the same manufacturer, or, alternatively, may be made by multiple manufacturers. The product source 205 may also store data relating to the sales of products offered from the product source 205. The product source 205 may be, by way of example only, a database of records pertaining to various information about the products offered for sale. The product source 205 need not be limited to a single company or entity. Rather, the exemplary product source 205 can be spread over multiple entities that will distribute their products through the system for cross-channel sales.

The system also includes a first sales channel 210 and at least one second sales channel 215. In one exemplary embodiment, each sales channel represents a different distribution chain for a given company or group of companies. By way of example only, for companies that distribute products both through the internet and through traditional "brick-and-mortar" retail stores, the first sales channel 210 could be the brick-and mortar distribution channel, while the second sales channel 215 could be the internet distribution channel. In an alternative example, companies that distribute products from multiple sources through a single endpoint, such as an internet website, each sales channel could represent the sales channel for a particular source.

In an exemplary embodiment, each sales channel may sell the same products, but the sales of those products may have different parameters. By way of example, a product sold through the first sales channel 210 may have a certain price associated with the transaction, and the purchaser may be allowed to apply certain special offers, such as coupons, discounts, or offers that allow the item to be sold at a discount when the purchase of the item is combined with the purchase of other items. These same parameters may or may not apply to the same product when offered through the second channel. In addition, there need not be complete unity of product offering between the first and second sales channels 215. The first sales channel 210 may offer selection and inventory that varies from the second sales channel 215.

The first sales channel 210 and second sales channel 215 receive item data from the product source 205. In an exemplary embodiment, the item data received from the product source 205 relates to the products that will be sold through the first and second sales channels 215. Exemplary item data can include, but is not limited to, a suggested retail price, a unique identifier (such as a Stock Keeping Unit, or SKU), information identifying the product source 205, and information particular to the product (such as, for example, size, color, ratings, comments, specifications, and available options). One of skill in the art would recognize that item data can vary greatly depending on the type of item, and the disclosure of exemplary item data here is not intended to limit the breadth of item data that the system disclosed herein can use.

Item data that has been received in the first or second sales channel 215 may then receive additional item data pertaining to that particular channel. By way of example, each sales channel may have a sales price that may differ from the price received from the product source 205. Each sales channel may have additional item data such as discounts that can apply to the item when purchased through that channel, inventory information for that item for the given channel, and an additional unique identifier for that item with respect to that given sales channel.

In an exemplary embodiment, the first and second sales channels 215 can be databases that store the item data for the particular sales channel. In this embodiment, the databases are affiliated with different organizations. By way of example, the different organizations can be different corporate entities. As an alternative example, the different organizations can be different divisions within the same corporate entity. As yet another alternative example, the different organizations can be different avenues to the customer within a single corporate entity. In the exemplary embodiment it is to be noted that the differing sales channels do not receive item data from one another directly, but rather, receive item data from the product source 205.

The system also includes a product persistence database 220. The product persistence database 220 receives item data from the first and at least one sales channel. In the exemplary embodiment, the product persistence database 220 provides a data source that combines item data from the various sales channels and provides the feature of allowing each of the sales channels to be accessed from a single point, as will be described in further detail below. In an exemplary embodiment, the product persistence database 220 is a database that is coupled to the first and second sales channel 215. In this embodiment, the product persistence database 220 populates its item data from the sales channels on a period basis, such as hourly, daily or monthly. In an alternative exemplary embodiment, however, the product persistence database 220 can be continually populated, or populated on an ad-hoc or an on demand basis.

The product persistence database 220 takes the item data from the sales channels and converts it into product data. Product data combines information about a given product with respect to the varying sales channels.

Figure 3:
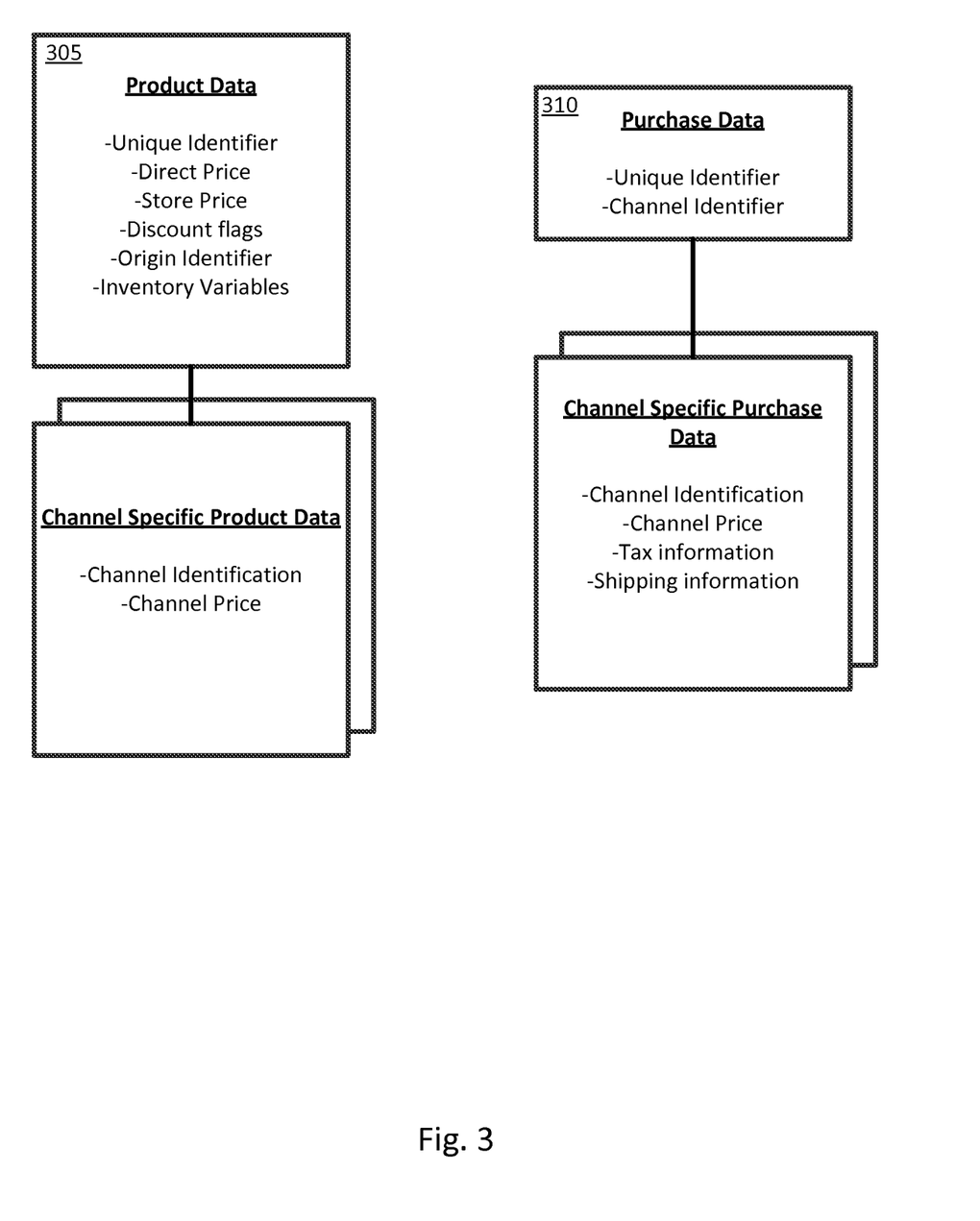
FIG. 3 is a block diagram representing data structures that may be used in the exemplary embodiment of a system for cross-channel sales.

Turning to FIG. 3, an exemplary embodiment of product data is shown. In the exemplary embodiment, product data includes sufficient information to identify the item data, the sales channel from which the item data originated, and any information unique to that item with respect to a give channel. As shown in FIG. 3, the product data includes a unique identifier for the item, a price for the item if purchased from the first sales channel 210, a price for the item if purchased from the second sales channel 215, flags or other records pertaining to the discounts that are available for that item for the various sales channels. Exemplary product data also includes inventory information pertaining to the product for each of the sales channels. In the event that the product is not available from all of the sales channels, the product data may not include information pertaining to the channels from which it is not available, or alternatively, may include an affirmative indication that it is not available from a given sales channel.

Turning back to FIG. 2, the product persistence database 220 is coupled to a search interface 225. In the exemplary embodiment, the search interface 225 provides a unified interface between the product persistence database 220 and devices that may need to access the product persistence database 220 to complete a sale. The exemplary search interface 225 is a server that provides functions that are accessible by such devices. By way of example, the search interface 225 may provide functions that allow a point-of-sale server (POS server 235) to look up the price or availability of a particular product. The search interface 225 may also allow searching from other points of sale, such as a company website or another retail outlet.

The functions provided by the search interface 225 may also allow a search for products from a specific sales channel or from all sales channels. The search interface 225 is configured to search within the product persistence database 220 for the information. By way of example, the search interface 225 can call procedures, such as remote procedure calls, made available by the product persistence database 220. As another example, the search interface 225 can issue a SQL query into the product persistence database 220 to retrieve the requested information. One of skill in the art would understand, however, that just as the product persistence database 220 is not limited to a SQL based relational database, the search interface 225 may retrieve information from the product persistence database 220 in any of the ways data is commonly retrieved from a database, whether relational or otherwise, all of which are within the skill of the ordinary artisan. In the exemplary embodiment, the search interface 225 will receive product data from the product persistence database 220 in response to the search.

Once the search interface 225 has obtained the search results from the product persistence database 220, in an exemplary embodiment, it passes that product data to a POS server 235. In an alternative exemplary embodiment, it passes the product data to another point of sale, such as a company sales website. In the exemplary embodiment, the POS server 235 is associated with a particular retail outlet. The POS server 235 then provides support for a point-of-sale device (POS device 230). The exemplary POS server 235 is a typical computer server that stores the product data information that has been received from the product persistence database 220.

One of the advantages of the system disclosed herein is that the POS server 235 can access product data that is available from multiple sales channels. Conventional point of sale systems associated with a given retail outlet typically only have access to product data about the inventory that is available at that retail outlet, i.e., a single sales channel. By using the system disclosed here, the POS server 235 can offer sales from any of the sales channels that are coupled to the product persistence database 220. The POS server 235 can also offer those sales as part of a single transaction.

Take, by way of example only, the common situation in which a customer wishes to purchase several items at a retail store, but one of the items the customer wishes to purchase is out of stock at the store, but is available through the store's website for delivery. In a conventional system, the customer would have to complete their purchase at the retail outlet for the products that are available, and then engage in a second transaction with the company's internet site. This results in two transactions for the customer, and the company may lose the second sale because the customer may lose interest in going through the second purchase. The customer may also not wish to make purchases over the internet for various reasons, such as being unwilling to pay for shipping, or over security concerns.

The system described herein remedies that issue. Under the system described herein, when the customer goes to make their purchase, because the POS server 235 is able to search for products available through all of the sales channels, including sales channels other than the sales channel that typically provides products to the retail outlet. In addition, as will be described in greater detail below, because the POS server 235 may access price, discount, and inventory information for all of the sales channels, the POS server 235 has the ability to, for example, reconcile price differences and provide the customer products from an alternative sales channel at the price they would have paid had the product been available from the retail outlet. The POS server 235 also has the ability to determine whether a product would need to be shipped to the customer, and can determine whether the product should be shipped for free, and whether sales tax should be applied to the transaction. An additional advantage is that the POS server 235 can provide all of these services in a single transaction to the customer, so the customer can complete their purchase with a single financial exchange, such as a tender of cash or a single credit card swipe. The tender can also be a mixed tender, wherein a portion of the payment for the transaction can be provided by one type of tender, such as by a gift card or credit card, while another portion of the payment can be provided by another type of tender, such as cash, check, or mobile wallet payment. One of skill in the art would understand that the specific tender is not limited to the listed transactions, but extends to any known form of tender that a company may choose to receive as payment.

The exemplary POS server 235 supports at least one POS device 230, which, in an exemplary embodiment, is a cash register or sales terminal that is operated by salespeople at the retail outlet. The POS device 230 receives the product data for the products the customer is purchasing, and once the customer has completed the transaction, transmits purchase data about the transaction to the POS server 235.

Turning again to FIG. 3, exemplary purchase data is described. The exemplary purchase data includes an identification of the product that was purchased and the sales transaction through which that purchase will be fulfilled. Purchase data also includes information specific to the channel from which the product was purchased, such as the identification of the channel, the price charged for the good from that channel, sales tax charged, and shipping information. As one of skill in the art would understand, the purchase data can be any data that is relevant to a purchase for a given organization, and is not limited to the examples described herein.

The exemplary POS server 235 can also support a virtual-point-of-sale server (VPOS server 250). An exemplary VPOS server 250 is a computer server that allows remote devices, such as computers, tablets, or mobile devices to act as individual points of sale that the customer can use in the store in lieu of carrying their purchases with them to the POS device 230 described above. The VPOS server 250 receives product data from the POS server 235 and returns purchase data that it receives from the VPOS device 255.

The VPOS server 250 is coupled to one or more VPOS devices 255. An exemplary VPOS device 255 provides users the ability to scan barcodes or other scannable indicia of product identification, and then add that item to the purchase. An exemplary VPOS device 255 in the present system also provides the user with the ability to search the various sales channels for products that might not be available in the retail outlet, and purchase those items with a single transaction at the time of purchase. The VPOS device 255 can also allow the customer to use a credit card or mobile payment method (such as Near Field Communications payment) to complete the transaction. Like the relationship between the POS device 230 and the POS server 235, the VPOS receives product data from the VPOS server 250 and returns purchase data pertaining to the customer's transaction.

Once a transaction has been completed, the purchase data is returned to the POS server 235. The POS server 235 then sends the transaction information along for processing. First, the POS server 235 sends the purchase data back to the product source 205 for accounting purposes. The product source 205 will then have a record of the purchase and the information pertinent thereto. In the event that there are multiple product sources 205, the POS server 235 can divide the purchase data and send each product source 205 the portion of the purchase data that is relevant to that product source 205. In an alternative embodiment, the POS server 235 can divide the purchase data among the sales channels that are relevant to the purchase, and send the pertinent data to the relevant sales channels for accounting purposes.

In an exemplary embodiment, the POS server 235 also sends the purchase data to an order processing server 245. The exemplary order processing server 245 takes the purchase data and determines whether any sales have to be fulfilled by shipping products to the customer. If so, the purchase data is sent to an order management server 260 that completes the shipment.

In an exemplary embodiment, the POS server 235 also collects customer data. The customer data may be information that identifies the customer. By way of example, if the customer is enrolled in a reward program, the customer may have a unique identification number that identifies the customer and allows the POS server 235 to access information that the customer has provided, such as a credit card number, an address, a record of their purchases, or special offers that the customer might be entitled to. Alternatively, the POS server 235 may collect the customer data as provided by the customer at the time. For example, the customer may not be enrolled in any reward program, and as such, if items are to be shipped to the customer, the POS (or VPOS) may need to collect that customer's address. In an exemplary embodiment, the customer data is provided to a customer data server 240 coupled to the POS server 235. The customer data server 240 can then send the relevant customer data (such as the address) to the order management server to be used to complete the transaction.

Figure 4:
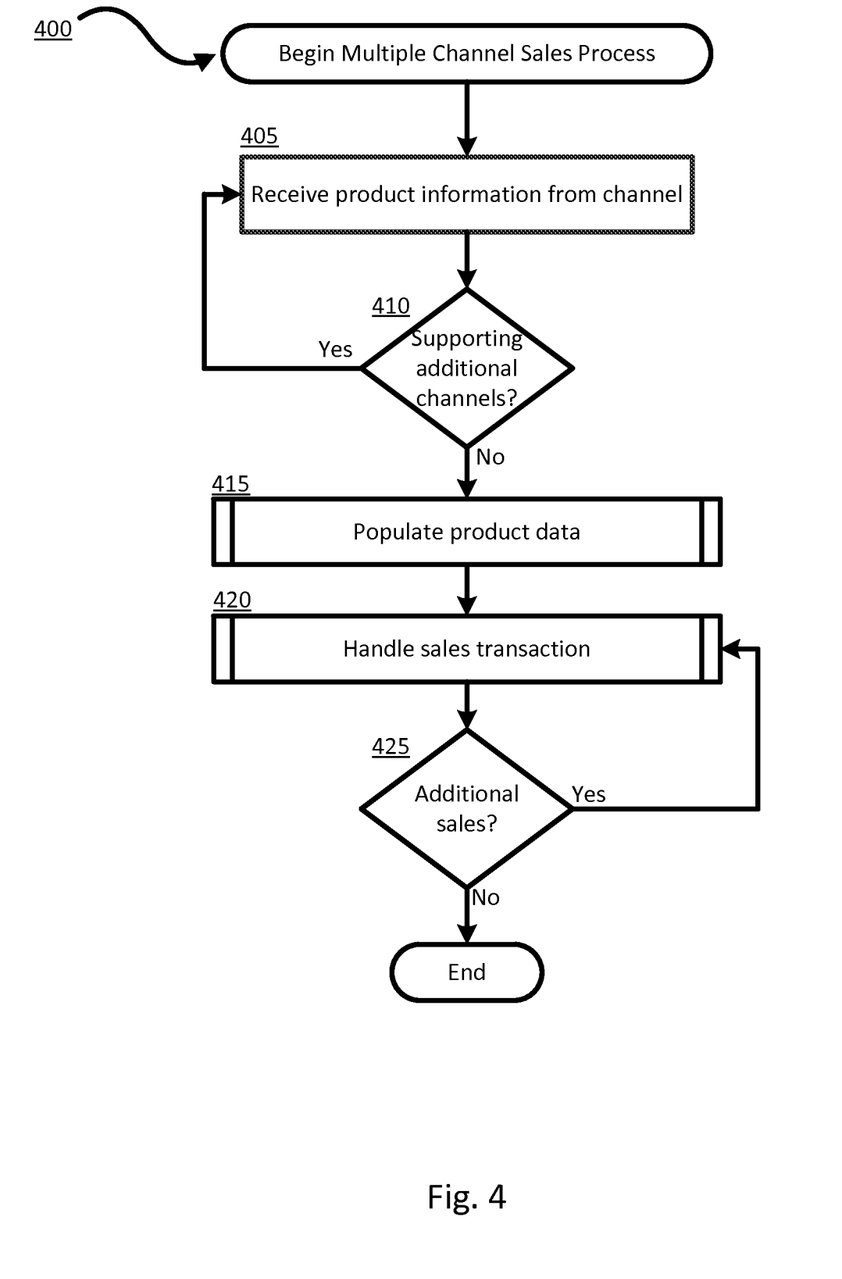
FIG. 4 is a flow chart illustrating an exemplary method for method for selling products through multiple sales channels in accordance with the methods and systems described herein.

Turning now to FIG. 4, an exemplary method 400 for selling products through multiple sales channels is described. FIG. 4 will be described with respect to FIGS. 2 and 3. In step 405, product information is received from a sales channel. In the exemplary embodiment, the product persistence database 220 received the product information from the channel. The method then proceeds to step 410, wherein it is determined whether or not the system is supporting additional channels that have not yet provided product information. If the determination in step 410 is affirmative, the YES branch is followed and the method returns to step 405 and receives product information from the next sales channel. If, on the other hand, the determination in step 410 is negative, the NO branch is followed and the method proceeds to step 415.

In step 415 the product data is populated. In an exemplary embodiment, the product data is populated by the product persistence database 220. The steps involved in populating the product data will be described in greater detail with respect to FIG. 5. The method then proceeds to step 420, in which the system handles the sales transaction. The steps involved in handling the sales transaction will be described in greater detail with respect to FIG. 6. The method then proceeds to step 425, wherein it is determined if additional products are to be sold. If the determination is affirmative, the method follows the YES branch back to step 420 to handle the products. If the determination is negative, the method follows the NO branch and terminates.

Figure 5:
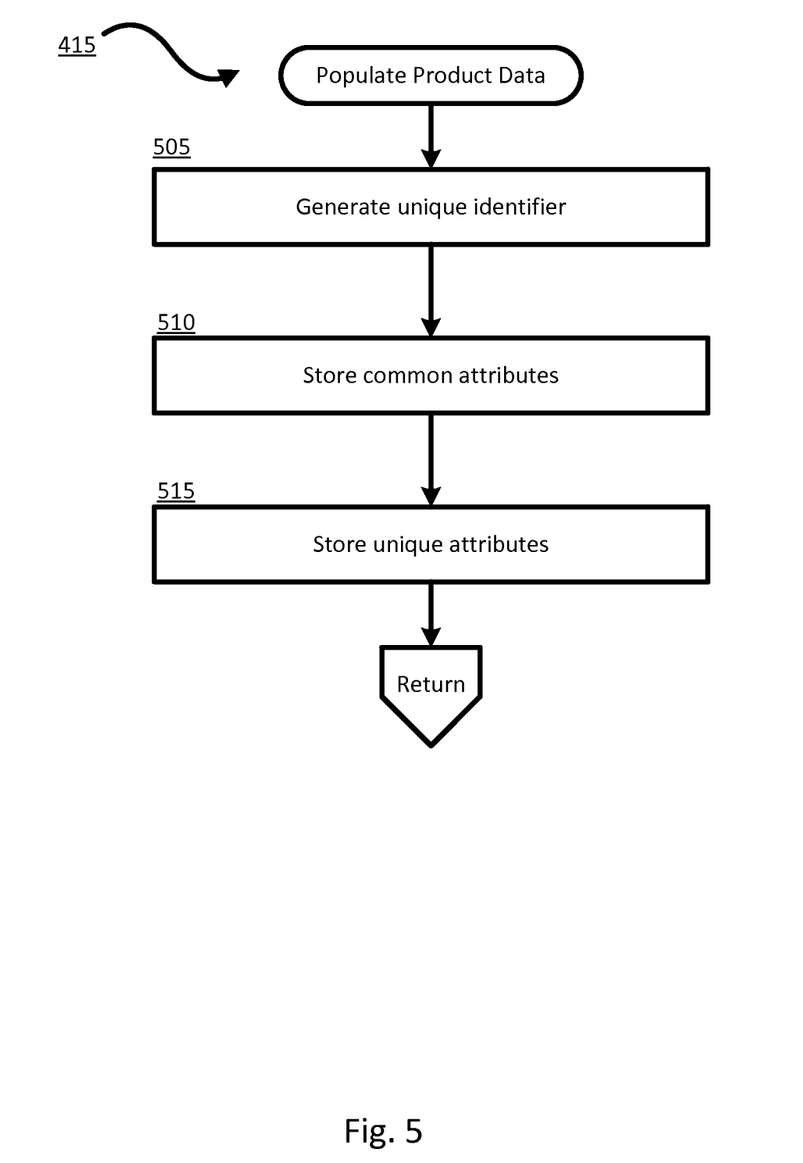
FIG. 5 is a flow chart illustrating an exemplary method for populating the product data in accordance with the methods and systems described herein.

Turning now to FIG. 5, the method 415 for populating the product data is described in greater detail. FIG. 5 will be described with respect to FIGS. 2-4. The method begins at step 505, where a unique identifier is generated for the product data. By way of example, the unique identifier may be a SKU for the product. However, the unique identifier can be any number, series of characters, or other identifier that allows the system to distinguish between products stored in the product persistence database 220.

The method then proceeds to step 510, wherein attributes for the product that are common among the sales channels from which the product is available are stored. By way of example, if the product has the same name, color, and size, those attributes may only be stored once with respect to the product. Although, as one of skill in the art would understand, there may be situations in which even common attributes are stored separately for each sales channel from which the product is available.

The method then proceeds to step 515, wherein attributes unique to each sales channel from which the product is available are stored. By way of example, unique attributes might include the price, the discounts available on that product, and the cost of shipping the product. Once the common and unique attributes have been stored, the method returns to step 420 of FIG. 4.

Figure 6:
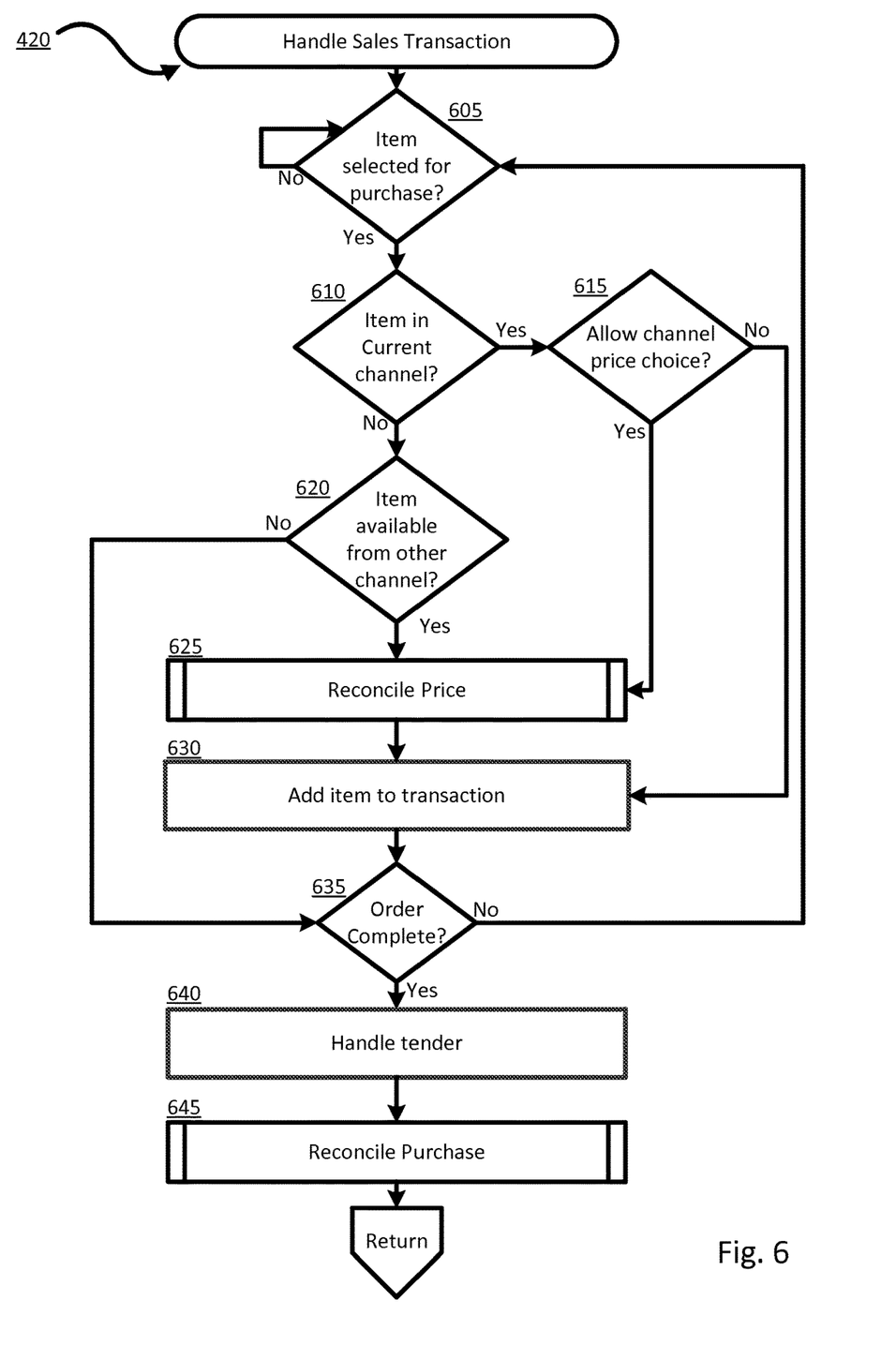
FIG. 6 is a flow chart illustrating an exemplary method of handling a sales transaction in accordance with the methods and systems described herein.

Turning now to FIG. 6, the method 420 of handling the sales transaction is described in greater detail. FIG. 6 will be described with respect to FIGS. 2-4. In step 605, it is determined whether an item has been selected for purchase. If the determination is negative, the method follows the NO branch and remains at step 605 until an item is selected. If the determination is affirmative, the YES branch is followed and the method proceeds to step 610, wherein it is determined whether the item is in the current channel. In an exemplary embodiment, the determination in 610 is made by the POS server 235 querying the search interface 225, which in turn, queries the product persistence database 220. By way of example, the current channel may be a particular retail outlet.

If the determination in step 610 is affirmative, the YES branch is followed to step 615, wherein it is determined that, if the item is available from multiple channels, to allow for a choice of prices among the channels. If the determination is affirmative, the method follows the YES branch and proceeds to step 625 to reconcile the price. Otherwise, the NO branch is followed to step 630 and the item is added to the transaction at the price from the current channel.

Returning to step 610, in which it was determined whether the item is available in the current channel, if the determination is negative, the NO branch is followed to step 620. In step 620, it is determined whether the item is available from another channel. If the determination is affirmative, the method follows the YES branch and proceeds to step 625, wherein the price is reconciled between the sales channels. The steps involved in reconciling the price will be described in greater detail with respect to FIG. 7. The method then proceeds to step 630 wherein the item is added to the transaction at the reconciled price. The method then proceeds to step 635. If, on the other hand, the determination in step 620 is negative, the product cannot be purchased and the NO branch is followed to step 635. In step 635, it is determined whether the customer has completed their order. If the determination in step 635 is negative, the NO branch is followed and the method returns to step 605 to continue the transaction. If, on the other hand, the determination in step 635 is affirmative, the method follows the YES branch to step 640.

In step 640, the tender is handled. In an exemplary embodiment, the tender for the purchase is received by the operator of a POS and entered into the system. The tender can be any form of tender accepted by the company selling the product, and is not intended to be limited to any particular type of tender. The method then proceeds to step 645, wherein the purchase is reconciled. The steps involved in reconciling the price will be described in greater detail with respect to FIG. 8. The method then returns to step 425 of FIG. 4.

Figure 7:
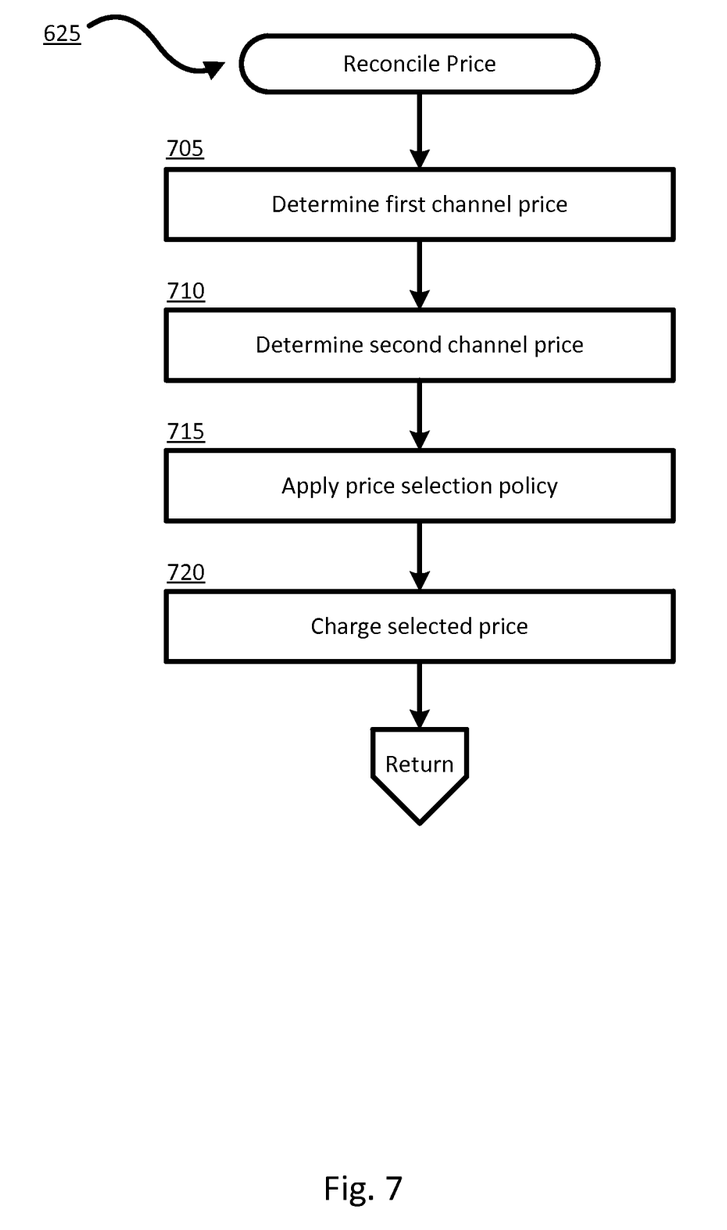
FIG. 7 is a flow chart illustrating an exemplary method of reconciling the price in accordance with the methods and systems described herein.

Turning now to FIG. 7, the method 625 for reconciling the price is described. The method of FIG. 7 will be described with respect to FIGS. 2-4 and 6. In step 705, the price of the item from the first channel is determined. In the exemplary embodiment, the price can be determined by querying the search interface 225 for price information from the first sales channel 210. Alternatively, the price can be determined by querying the search interface 225 for price information for all of the sales channels. In yet another alternative, the price can be determined from the product data, which may include price information for all of the channels from which the product is available.

The method then proceeds to step 710, wherein the price of the item from the second channel is determined. The price of the item from the second channel can be determined in a similar fashion as the price of the item in the first channel was determined. The method then proceeds to step 715, wherein a price selection policy is applied to the pricing to determine which price to charge the customer.

The price selection policy can vary, and may depend on the business practices of the company selling the product. In one exemplary price selection policy, the lowest possible price for an item is charged. In this exemplary policy, a product being purchased from any sales channel will be assigned the lowest price for that product among all of the sales channels from which it is available. In another exemplary embodiment, the product will always be priced at the price associated with the channel in which the customer is attempting to purchase the item. For example, if the customer is attempting to purchase an item at a retail outlet, but the item is unavailable there, but is available through the company's internet sales channel, the customer will be charged the store price for the item, no matter what the internet sales channel price is. In yet another alternative embodiment, the customer can be given a choice of which price to pay. One of skill in the art would understand that there are many permutations of a price selection policy that are available in the system as described herein.

After applying the price selection policy, the method proceeds to step 720, in which the selected price is charged. The method then returns to step 630 of FIG. 6.

Figure 8:
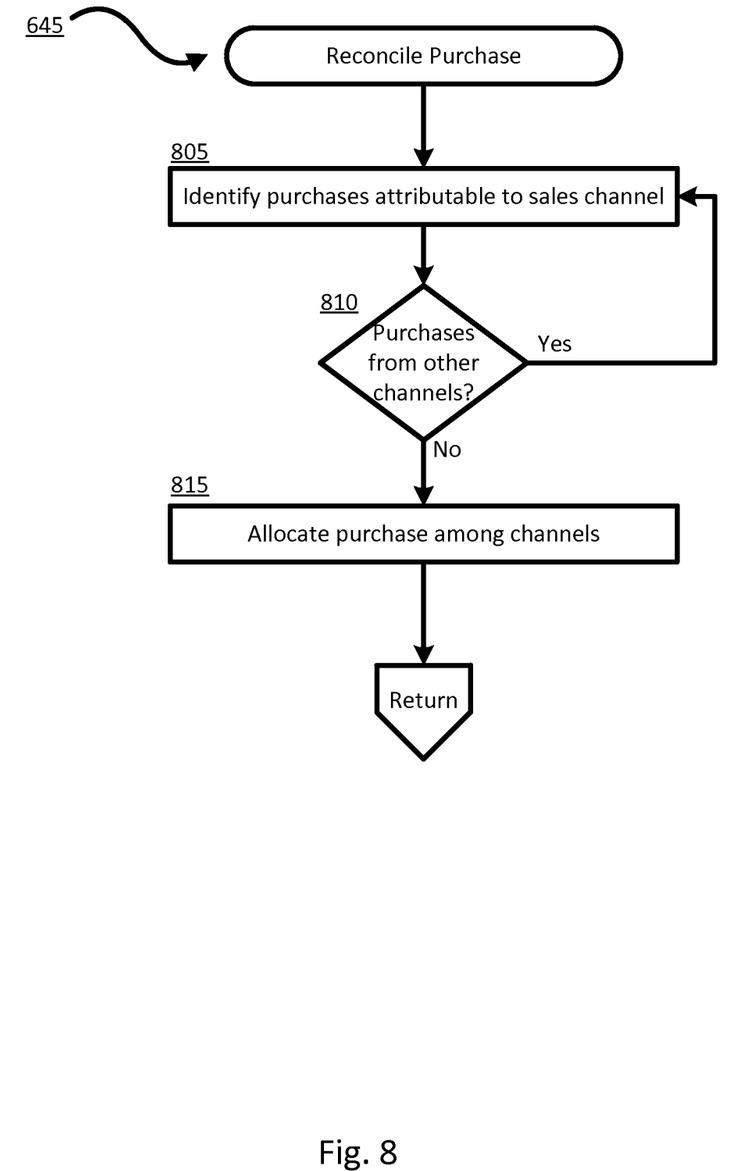
FIG. 8 is a flow chart illustrating an exemplary method for reconciling the purchase in accordance with the methods and systems described herein.

Turning now to FIG. 8, the method 645 for reconciling the purchase is described. FIG. 8 will be described with respect to FIGS. 2-4 and 6. Beginning with step 805, the system identifies the purchases that are attributable to a given sales channel. In an exemplary embodiment, this is done by the POS server 235 based on product data it received from the product persistence database 220. In an alternative exemplary embodiment, this can be done by the sales channels themselves based on the data associated with the purchase. Specifically, the sales channel can receive purchase data and determine whether any of the purchase data relates to products that came from that sales channel.

The method then proceeds to step 810, in which it is determined whether purchases were made from other sales channels. If the determination in step 810 is affirmative, the method returns to step 805 and identifies the purchases attributable to those other channels. If, on the other hand, the determination in step 810 is negative, the method proceeds to step 815, in which the tender from the purchase is allocated among the sales channels from which the purchase was made. In an exemplary embodiment, a payment will initially be allotted to the first channel, wherein the first channel is the channel that was presented to the customer. The remainder can then be allocated across the remaining channels. In an alternative exemplary embodiment, the payment will be allotted by examining the channel to which the purchase is credited to determine how to allocate the transaction. The method then returns to step 425 of FIG. 4.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for purchasing products, comprising:
   storing, in a first sales channel database, information pertaining to products only to be sold at physical retail locations;
   storing, in a second sales channel database distinct from the first sales channel database, information pertaining to products to be sold only directly to customers via the internet;
   retrieving the information pertaining to products to be sold at physical retail locations from the first sales channel database and the information pertaining to products to be sold directly to customers via the internet from the second sales channel database;
   populating a product persistence database with the information about the products stored in the first sales channel database and the second sales channel database, said populating comprising the steps of;
      creating item data associated with each product, said item data comprising a unique identifier and common attributes, the common attributes comprising attributes of the product that are data that is common to the product, regardless of whether the product originated from the first sales channel database or the second sales channel database, and wherein the common attributes comprise at least one of the product name, color, size, and price associated with the product;
      for each sales channel database in which each product is stored, associating unique attributes with the item data, the unique attributes comprising attributes of the product that are data that differ for the product in at least one sales channel database, and wherein the unique attributes comprise at least one of the price of the product, the discounts available for the product, and the cost of shipping the product;
   identifying a first product to be purchased;
   determining whether the first product is available from the first sales channel database by searching the product persistence database;
   in response to determining that the first product is not available from the first sales channel database, determining whether the first product is available from the second sales channel database by searching the product persistence database;
   in response to determining that the first product is available from the second sales channel database, adding the first product from the second sales channel database to the transaction, wherein the transaction comprises the item data, the common attributes, and the unique attributes associated with the item data associated with the product; and
   selling the first product from the second sales channel database, wherein the transaction is completed with a single tender.

2. The method of claim 1, further comprising the step of reconciling the purchase of the first product and the second product among the first sales channel database and the second sales channel database.

3. The method of claim 2, wherein the reconciling step further comprises the steps of:
   identifying purchases attributable to the first sales channel database;
   identifying purchases attributable to the second sales channel database;
   allocating the purchases attributable to the first sales channel database to the first sales channel database; and
   allocating the purchases attributable to the second sales channel database to the second sales channel database.

4. The method of claim 1, wherein the tender comprises at least one of: a credit card transaction, a debit card transaction, a cash transaction, and a near field communications transaction.

5. The method of claim 1, further comprising the step of reconciling the price of the first product.

6. The method of claim 5, wherein the step of reconciling the price comprises the steps of:
   determining a first sales channel database price;
   determining a second sales channel database price;
   applying a price selection policy; and
   charging the selected price.

7. The method of claim 6, wherein the price selection policy comprises at least one of:
   charging the lowest price for an item, charging the price associated with the first sales channel database for the item, and allowing the customer to choose a price.

8. The method of claim 1, wherein the first sales channel database is associated with a first organization and the second sales channel database is associated with a second organization.

9. A system for purchasing products, comprising:
   a point of sale device configured to allow a customer to purchase products from a first sales channel and a second sales channel, the point of sale device configured to receive payment information;
   the first sales channel comprising a first database of information pertaining to products to be sold only at physical retail locations;
   the second sales channel comprising a second database distinct from the first database of information pertaining to products to be sold only directly to customers via the internet;
   a product persistence database coupled to the first and second sales channels, the product persistence database configured to retrieve product data about the products stored in the first and second sales channels;
   the product persistence database comprising item data associated with each product, said item data comprising a unique identifier and common attributes, the common attributes comprising attributes of the product that are data that is common to the product, regardless of whether the product originated from the first sales channel database or the second sales channel database, and wherein the common attributes comprise at least one of the product name, color, size, and price associated with the product;
   the item data further comprising a unique attribute for each sales channel in which the product is stored, the unique attributes comprising attributes of the product that differ for the product in at least one sales channel database, and wherein the unique attributes comprise at least one of the price of the product, the discounts available for the product, and the cost of shipping the product; and
   a search interface coupled to the point of sales device and the product persistence database and configured to search the product persistence database for a product and provide product data to the point of sales device pertaining to products, wherein the point of sale device is further configured to allow a customer to purchase products from the first and second sales channel in a single transaction, wherein the transaction comprises the item data, the common attributes, and the unique attributes associated with the item data associated with the product.

10. The system of claim 9, wherein the point of sale device reconciles the price of products based on the purchase price.

11. The system of claim 9, wherein the point of sale device reconciles the price of products based on the sales channel in which the customer approached the point of sale device.

12. The system of claim 9, wherein the first sales channel includes information about products for sale from a first organization, and wherein the second sales channel includes information about products for sale from a second organization.

13. The system of claim 9, wherein the single transaction comprises a single tender to purchase all products without regard to the sales channel from which the products originated.

14. The system of claim 13, wherein the single tender comprises a mixed tender, the mixed tender comprising tender of at least a first type and a second type.

15. The system of claim 14, wherein the point of sale device is a virtual point of sale device.

16. A system for purchasing products, comprising:
a point of sale device configured to receive a request to purchase a first product and to determine whether the first product is available for sale in one of a first sales channel and a second sales channel;
a search interface coupled to the point of sale device, the search interface configured to receive requests to search for the first product from the point of sale device;
a product persistence database coupled to the search interface, the product persistence database configured to retrieve product data from at least a first sales channel and a second sales channel, the first sales channel comprising a first database of information pertaining to products to be sold only at physical retail locations, and the second sales channel comprising a second database distinct from the first database of information pertaining to products to be sold only directly to customers via the internet, and to populate a product data record with information from the first sales channel and the second sales channel, the product persistence database further configured to return a product data record for the first product in response to receiving a request for product data from the search interface;
the product persistence database further comprising item data associated with each product in the first sales channel and the second sales channel, the item data comprising a unique identifier and common attributes, the common attributes comprising attributes of the product that are data that is common to the product, regardless of whether the product originated from the first sales channel database or the second sales channel database, and wherein the common attributes comprise at least one of the product name, color, size, and price associated with the product;
the item data further comprising a unique attribute for each sales channel in which the product is stored, the unique attributes comprising attributes of the product that differ for the product in at least one sales channel database, and wherein the unique attributes comprise at least one of the price of the product, the discounts available for the product, and the cost of shipping the product,
wherein the point of sale device includes the first product and a second product in a single transaction, wherein the first product and the second product are received from separate sales channels.

17. The system of claim 16, wherein the first sales channel and the second sales channel are affiliated with different organizations.

* * * * *